(12) United States Patent
Chao et al.

(10) Patent No.: US 10,354,119 B2
(45) Date of Patent: Jul. 16, 2019

(54) PIXEL MODULE AND FINGERPRINT IDENTIFICATION SYSTEM

(71) Applicant: SHENZHEN GOODIX TECHNOLOGY CO., LTD., Shenzhen, Guangdong (CN)

(72) Inventors: Kuohao Chao, Shenzhen (CN); Mengta Yang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 30 days.

(21) Appl. No.: 15/509,279

(22) PCT Filed: Jan. 21, 2016

(86) PCT No.: PCT/CN2016/071679
§ 371 (c)(1),
(2) Date: Mar. 7, 2017

(87) PCT Pub. No.: WO2017/071130
PCT Pub. Date: May 4, 2017

(65) Prior Publication Data
US 2017/0277929 A1 Sep. 28, 2017

(30) Foreign Application Priority Data
Oct. 28, 2015 (CN) .......................... 2015 1 0716069

(51) Int. Cl.
*G06K 9/00* (2006.01)
(52) U.S. Cl.
CPC .......... *G06K 9/001* (2013.01); *G06K 9/0002* (2013.01); *G06K 9/00053* (2013.01)

(58) Field of Classification Search
USPC .......................................................... 382/124
See application file for complete search history.

(56) References Cited

U.S. PATENT DOCUMENTS 6,628,812 B1 9/2003 Setlak et al.
6,950,541 B1 9/2005 Setlak et al.
(Continued)

FOREIGN PATENT DOCUMENTS

CN 1623162 A 6/2005
CN 101173578 A 5/2008
(Continued)

OTHER PUBLICATIONS

International Search Report issued in PCT/CN2016/071679, dated Jul. 21, 2016.
(Continued)

*Primary Examiner* — Jerome Grant, II
(74) *Attorney, Agent, or Firm* — Heslin Rothenberg Farley & Mesiti P.C.

(57) ABSTRACT

A pixel module and a fingerprint identification system are provided. The pixel module includes: a top-layer electrode, configured to receive a contact of a finger, a contact capacitance being formed between the top-layer electrode and the finger; a pixel circuit, configured to detect a capacitance value of the contact capacitance; and a resistor, coupled between the top-layer electrode and the pixel circuit. The pixel module suppresses the electrostatic current formed by the electrostatic charges, thereby achieving the effect of electrostatic protection.

4 Claims, 2 Drawing Sheets

(56) References Cited

U.S. PATENT DOCUMENTS

| | | | |
|---|---|---|---|
| 2003/0215116 A1 | 11/2003 | Brandt et al. | |
| 2010/0244021 A1 | 9/2010 | Uochi et al. | |
| 2016/0063301 A1* | 3/2016 | Wu | G06K 9/00033 382/124 |
| 2016/0307020 A1* | 10/2016 | Zhang | G06K 9/0002 |
| 2017/0162620 A1* | 6/2017 | Wang | H01L 27/14618 |
| 2017/0323136 A1* | 11/2017 | Zhan | G06K 9/0002 |
| 2017/0323147 A1* | 11/2017 | Zhan | G06K 9/00087 |
| 2018/0060637 A1* | 3/2018 | Chao | G06K 9/0002 |
| 2018/0129848 A1* | 5/2018 | Wang | G06K 9/0002 |

FOREIGN PATENT DOCUMENTS

| | | | | |
|---|---|---|---|---|
| CN | 102682271 A | | 9/2012 | |
| CN | 104217193 A | | 12/2014 | |
| CN | 106557724 | * | 4/2017 | G06K 9/00 |
| JP | 2010251721 A | | 11/2010 | |
| WO | 2005/124659 A1 | | 12/2005 | |

OTHER PUBLICATIONS

Ko, Cheng-Ting et al., "A CMOS Micromachined Capacitive Tactile Sensor With High-Frequency Output", Journal of Microelectromechanical Systems, vol. 15, No. 6, Dec. 2006, pp. 1708-1714.

Golo, Natasa et al., "Dealing with electrostatic discharge in a capacitive fingerprint sensor fabricated in amorphous silicon thin film technology", MESA Research Institute, Jan. 2002, pp. 616-621.

Extended Search Report issued in European patent application No. 16840289.9 dated Aug. 24, 2017.

* cited by examiner

PIXEL MODULE AND FINGERPRINT IDENTIFICATION SYSTEM

CROSS REFERENCE TO RELATED APPLICATIONS

This application is the National Phase filing under 35 U.S.C. § 371 of International Application No. PCT/CN2016/071679, filed on Jan. 21, 2016, and claims priority to Chinese Application No. 201510716069.9, filed on Oct. 28, 2015. The contents of each of the prior applications are hereby incorporated by reference herein in their entirety.

TECHNICAL FIELD

The present disclosure relates to a pixel module and a fingerprint identification system, and in particular, relates to a pixel module having an electrostatic protection function and a fingerprint identification system.

BACKGROUND

With the development of science and technology, more and more portable electronic devices such as mobile phones, digital cameras, tablet computers, laptops and the like have become indispensable in people's life. Since the portable electronic devices are generally used by individuals and store some private data, the data stored in the electronic device, such as address books, pictures, personal information and the like, is privately owned. If an electronic device is lost, the data therein may be used by others, which may cause unnecessary losses. An electronic device may be prevented from being used by others by means of password protection. However, a password is easily revealed or cracked. Therefore, the level of data security is low. In addition, users are able to use an electronic device only when they remember the password. If the password is forgotten, much inconvenience may be caused to the users. Therefore, a personal fingerprint identification system has been currently developed for identity authentication to improve data security.

Generally, a fingerprint identification system includes a plurality of pixel modules arranged into an array, wherein each pixel module includes a top-layer electrode and a pixel circuit. As the fingerprint identification system needs to use the top-layer electrode to receive contact of a finger, and is different from typical integrated circuit package, the top-layer electrode needs to be exposed outside the integrated circuit, thereby causing the electrostatic charges to be accumulated in the vicinity of the top-layer electrode. Furthermore, during the manufacturing processes such as wafer sawing and encapsulation etc., the electrostatic charges may also be accumulated in the vicinity of the top-layer electrode. If the electrostatic charges accumulated at the top-layer electrode are too high, the electrostatic charges may generate an electrostatic current, which causes damages to the pixel circuit. On the other hand, the pixel circuit is generally arranged at the top-layer electrode, and the circuit area of the pixel circuit should be less than or equal to the area of the top-layer electrode. In other words, the pixel module (or the pixel circuit) applied in the fingerprint identification system is subject to restrictions of the circuit area, and it is impossible to accommodate an additional electrostatic protection circuit. As a result, the absence of the electrostatic protection function may damage the fingerprint identification system by the electrostatic current. Therefore, how to provide a pixel module and a fingerprint identification system that have an electrostatic protection function becomes an aim in this field.

SUMMARY

A technical problem to be solved by the present disclosure is to provide a pixel module having an electrostatic protection function, to address the defects in the prior art that are mentioned above.

In order to overcome the above technical problem, the present disclosure provides a pixel module. The pixel module includes: a top-layer electrode, receiving a contact of a finger, a contact capacitance being formed between the top-layer electrode and the finger; a pixel circuit, used for detecting a capacitance value of the contact capacitance; and a resistor, coupled between the top-layer electrode and the pixel circuit.

Preferably, the resistor is configured to suppress a current between the top-layer electrode and the pixel circuit.

Preferably, the resistor has a resistance higher than 10 ohms.

Preferably, the resistor is formed of a polycrystalline silicon layer in an integrated chip process.

Preferably, the pixel circuit is arranged below the top-layer electrode, and the pixel circuit has an area that is less than or equal to the area of the top-layer electrode.

To better solve the technical problem above, the present disclosure further provides a fingerprint identification system. The fingerprint identification system includes a plurality of pixel modules. Each pixel module includes: a top-layer electrode, configured to receive a contact of a finger, a contact capacitance being formed between the top-layer electrode and the finger; a pixel circuit, configured to detect a capacitance value of the contact capacitance; a resistor, coupled between the top-layer electrode and the pixel circuit; and a fingerprint judging module, coupled to the plurality of pixel modules, and configured to judge whether each pixel module corresponds to a finger ridge or a finger valley.

The pixel module according to the present disclosure includes a resistor R coupled between a top-layer electrode TP and a pixel circuit PC, wherein the resistor R is configured to suppress an electrostatic current between the top-layer electrode TP and the pixel circuit PC. That is, with respect to electrostatic charges having a fixed charge quantity, the resistor R is capable of effectively suppressing the value of the electrostatic current, thereby protecting the pixel circuit PC. Therefore, the pixel module according to the present disclosure has a better electrostatic protection function.

DETAILED DESCRIPTION

In order to make the objectives, technical solutions, and advantages of the present disclosure clearer, the present disclosure is further described in detail below by reference to the embodiments and the accompanying drawings. It should be understood that the embodiments described here are only exemplary ones for illustrating the present disclosure, and are not intended to limit the present disclosure.

Figure 1:
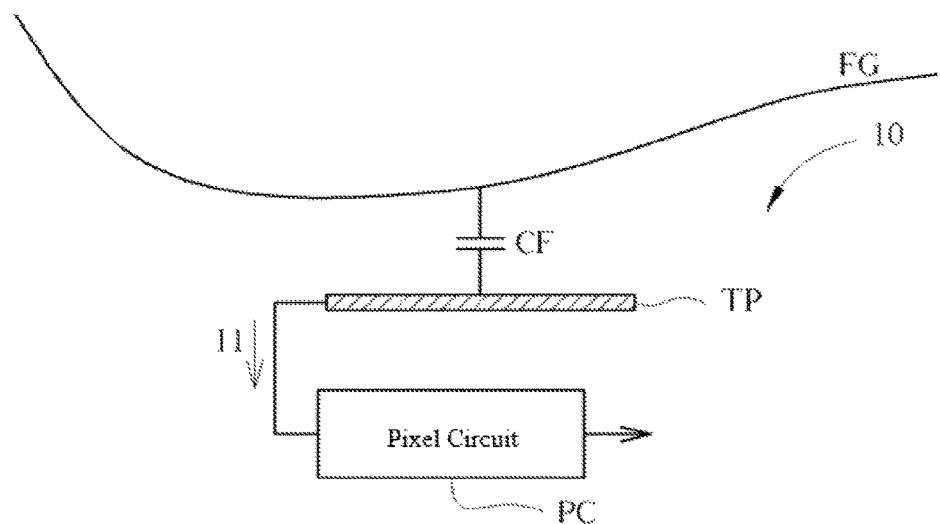
FIG. 1 is a schematic diagram of a pixel module in the prior art.

Referring to FIG. 1, FIG. 1 is a schematic diagram of a pixel module 10. As illustrated in FIG. 1, the pixel module 10 includes a top-layer electrode TP and a pixel circuit PC. The top-layer electrode TP is configured to receive a contact of a finger FG, wherein a contact capacitance CF is formed between the top-layer electrode TP and the finger FG. Since the top-layer electrode TP is exposed outside to receive the contact of the finger FG, and the pixel module 10 needs to be subjected to wafer sawing and encapsulation and the like manufacturing processes, electrostatic charges may be accumulated in the vicinity of the top-layer electrode TP. It should be noted that when the pixel circuit PC is directly and electrically connected to the top-layer electrode TP, the electrostatic charges in the vicinity of the top-layer electrode TP may generate an electrostatic current I1 to the pixel circuit PC; and when the electrostatic charges in the vicinity of the top-layer electrode TP are too high, the electrostatic current I1 may cause damages to the pixel circuit PC.

Figure 2:
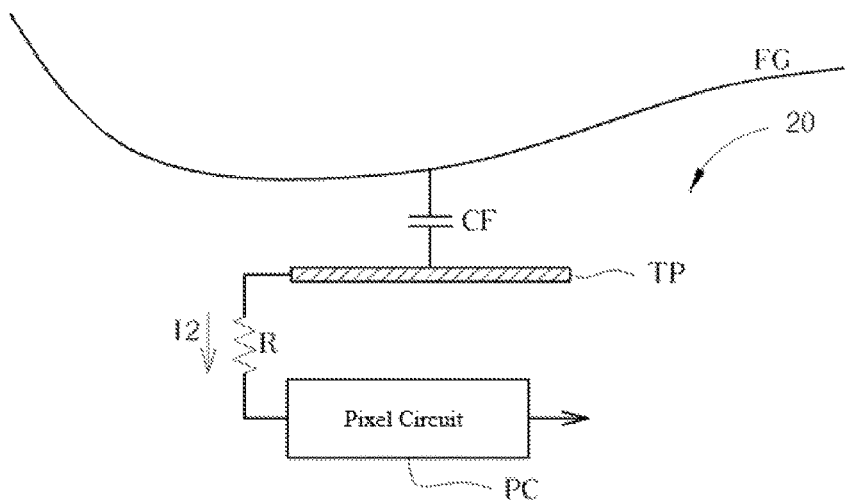
FIG. 2 is a schematic diagram of a pixel module according to an embodiment of the present disclosure.

To reduce the damages that may be caused by the current formed by the electrostatic charges to the pixel circuit, a resistor may be coupled between the top-layer electrode and the pixel circuit. Referring to FIG. 2, FIG. 2 is a schematic diagram of a pixel module 20 according to an embodiment of the present disclosure. The pixel module 20 includes a resistor R, a top-layer electrode TP and a pixel circuit PC. Similar to the pixel module 10, the top-layer electrode TP is configured to receive the contact of the finger FG, wherein a contact capacitance CF is formed between the top-layer electrode TP and the finger FG. In circuit layout, the pixel circuit PC is configured just under the top-layer electrode TP, and the pixel circuit PC occupies a circuit area that is less than or equal to the area of the top-layer electrode TP. Different from the pixel module 10, the pixel module 20 includes a resistor R coupled between a top-layer electrode TP and a pixel circuit PC, wherein the resistor R is configured to suppress electrostatic current I2 between the top-layer electrode TP and the pixel circuit PC. That is, with respect to electrostatic charges having a fixed charge quantity, the resistor R is capable of effectively suppressing the value of the electrostatic current I2, thereby protecting the pixel circuit PC.

Generally, the resistor R may be practiced without any limitation. For example, the resistor R may be achieved by using a polycrystalline silicon layer in the circuit layout, for example, the resistor may be formed by a polycrystalline silicon layer in the IC chip manufacturing process, which is, however, not limited thereto. The resistance of the resistor R is not limited. Preferably, the resistance of the resistor R is higher than 10 ohms.

In the prior art, since the pixel circuit is subject to restriction of the circuit area (In the case of applying to the pixel module of the fingerprint identification system, the circuit area occupied by the pixel circuit may be less than or equal to the area of the top-layer electrode), the pixel module fails to accommodate an additional electrostatic protection circuit; and with respect to the pixel circuit, the pixel module fails to achieve the effect of electrostatic protection. Over the prior art, the pixel module according to the present disclosure suppresses the electrostatic current formed by the electrostatic charges by using the resistor which coupled between the top-layer electrode and the pixel circuit, thereby achieving the effect of electrostatic protection.

Figure 3:
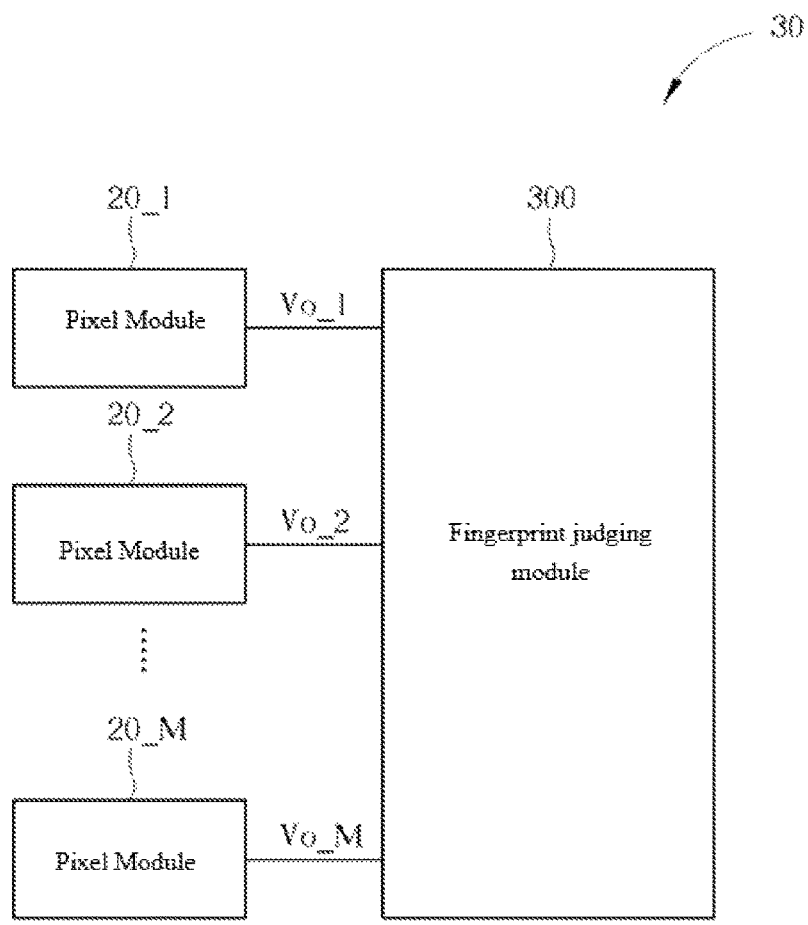
FIG. 3 is a schematic diagram of a fingerprint identification system according to an embodiment of the present disclosure.

In another aspect, the pixel circuit 20 may be applicable to a fingerprint identification system. Referring to FIG. 3, FIG. 3 is a schematic diagram of a fingerprint identification system 30 according to an embodiment of the present disclosure. The fingerprint identification system 30 includes pixel modules 20_1~20_M and a fingerprint judging module 300; wherein the pixel modules 20_1~20_M are the same as the pixel module 20 in terms of circuit structure, which are thus not described herein any further. The fingerprint judging module 300 is coupled to the pixel modules 20_1~20_M, and configured to judge, according to output signals Vo_1~Vo_M, whether the locations of the pixel modules 20_1~20_M correspond to a finger ridge or a finger valley of a user. It should be noted that the resistors R included in the pixel modules 20_1~20_M are capable of effectively suppressing the electrostatic current formed by the electrostatic charges, thereby achieving the effect of electrostatic protection.

In conclusion, the pixel module according to the present disclosure suppresses the electrostatic current formed by the electrostatic charges by using the resistor coupled between the top-layer electrode and the pixel circuit, thereby achieving the effect of electrostatic protection.

The present disclosure further provides a fingerprint identification system including: a plurality of pixel modules. Each pixel module includes: a top-layer electrode, configured to receive a contact of a finger, a contact capacitance being formed between the top-layer electrode and the finger; a pixel circuit, configured to detect a capacitance value of the contact capacitance; a resistor, coupled between the top-layer electrode and the pixel circuit; and a fingerprint judging module, coupled to the plurality of pixel modules, and configured to judge whether each pixel module corresponds to a finger ridge or a finger valley. The fingerprint identification system is capable of suppressing the electrostatic current formed by the electrostatic charges, thereby achieving the effect of electrostatic protection.

Described above are preferred embodiments of the present disclosure, and any equivalent modifications, polishments and the like made within the scope of the present disclosure should be covered within the scope of the present disclosure.

The described embodiments above are merely preferred embodiments of the present disclosure, but are not intended to limit the present disclosure. Any modification, equivalent replacement, and improvement made without departing from the spirit and principle of the present disclosure may fall within the protection scope of the present disclosure.

What is claimed is:

1. A fingerprint identification system, comprising a plurality of pixel modules, wherein each pixel module has an electrostatic protection function and comprises:
   a top-layer electrode, configured to receive a contact of a finger, a contact capacitance being formed between the top-layer electrode and the finger;
   a pixel circuit, configured to detect a capacitance value of the contact capacitance;
   a resistor, coupled between the top-layer electrode and the pixel circuit, wherein the resistor is configured to suppress an electrostatic current between the top-layer electrode and the pixel circuit; and
   a fingerprint judging module, coupled to the plurality of pixel modules, and configured to judge whether each pixel module corresponds to a finger ridge or a finger valley.

2. The fingerprint identification system according to claim 1, wherein the resistor has a resistance higher than 10 ohms.

3. The fingerprint identification system according to claim 1, wherein the resistor is formed of a polycrystalline silicon layer in a n integrated chip process.

4. The fingerprint identification system according to claim 1, wherein the pixel circuit is arranged below the top-layer electrode, and the pixel circuit has an area that is less than or equal to the area of the top-layer electrode.

\* \* \* \* \*